United States Patent Office 3,586,634
Patented June 22, 1971

3,586,634
ALKALI URANYL PHOSPHATE PHOSPHORS COACTIVATED WITH RARE EARTHS
Frank J. Avella, Flushing, N.Y., assignor to General Telephone & Electronics Laboratories Incorporated
No Drawing. Filed Feb. 19, 1968, Ser. No. 706,662
Int. Cl. C09k 1/30
U.S. Cl. 252—301.1   10 Claims

ABSTRACT OF THE DISCLOSURE

Condensed alkali uranyl phosphate phosphors coactivated with rare earth ions wherein the alkali metals are chosen from the group lithium, sodium, potassium, rubidium and cesium and the rare earth coactivators are chosen from the group europium, samarium and neodymium. These phosphors, when excited by ultraviolet, electron, ion or X-ray radiation, exhibit dominant emission colors which may be varied from green to red through white depending upon the coactivator selected and the molar concentrations. The phosphors, may be utilized as color correctors for mercury lamps, in cathode ray tube screens including screens for color television tubes, and in detectors for ion or X-ray beams.

BACKGROUND OF THE INVENTION

Field of the invention

This invention relates to a group of fluorescent materials which emit light when exposed ot ultraviolet, electron, ion or X-ray radiation. In particular, it relates to condensed alkali uranyl phosphate phosphors coactivated with rare earth elements which exhibit dominant emission colors varying from green to red through white.

Description of the prior art

Luminescent phosphate compositions containing uranyl ion as an activator have been reported in the literature. Nichols and Slattery in a paper titled "Uranium As An Activator," Rev. Sci. Inst. 12, 449 (1926) report the photo-and cathodoluminescence of uranyl ion in condensed phosphate system s referred to as $NaPO_3$ and $KPO_3$, the former being prepared by fusing microcosmic salt ($NaHNH_4PO_4 \cdot 4H_2O$). Dobrolyubskaya, as reported in Zh. Neorg. Khim. 28, 2004 (1963), investigated uranyl fluorescence in the condensed phosphates of sodium and concluded that the $(NaPO_3)_3$ ring structure was suitable as a host.

SUMMARY OF THE INVENTION

I have discovered that visible and infrared luminescence may be obtained under various excitation conditions from selected condensed alkali uranyl phosphate compositions coactivated with certain elements of the rare earth lanthanide series. More specifically, my invention relates to phosphors defined by the formula $$a(M_2O) \cdot b(UO_3) \cdot c(R_2O_3) \cdot d(P_2O_5)$$

where M is an alkali metal selected from the group consisting of Li, Na, K, Rb and Cs; R is a rare earth metal selected from the group consisting of Eu, Sm and Nd; and $a$, $b$, $c$, and $d$ are molar concentrations. As indicated by the designation "$UO_3$," the uranium is added and incorporated in the hexavalent state, and the actual luminescent species in the phosphor is the uranyl ion, $UO_2^{2+}$, as evidenced by its characteristic green fluorescence. The phosphate matrices disclosed herein are referred to as "condensed" to indicate that there is a sharing of oxygen atoms between two or more $(PO_4^{-3})$ tetrahedra to form chain or cyclic structures. Thus, the alkali orthophosphates (which would be defined by the above formula if $a=3$, $d=1$ and $b=c=0$) are excluded. In the condensed phosphates of the present invention $a/d$ is less than 3, the ratio of $a$ to $d$ being approximately unity for the more efficient materials.

It has been found that efficient green-emitting phosphors result when M is selected from the subgroup consisting of Li, Rb, or Cs or a combination of alkali metals, $b$ is in the approximate range 0.01 to 0.40, $c=0$ and $a/d=1$. Further, when M=Li, Na, K, Rb or Cs, $b=0.01$–0.40, $c$ has a value 0.01 to 0.09, $a/d$ is less than 3, and R is selected from a rare earth activator in the group Eu, Sm and Nd, fluorescence results from both the $UO_2^{2+}$ and the rare earth ions. The combination of $Eu^{3+}$ or $Sm^{3+}$ and $UO_2^{2+}$ produces several spectral bands or lines at wavelengths in the range 470 to 640 nanometers producing a range of emission colors depending on the molar concentration of each activator. The combination of $UO_2^{2+}$ as the activator and $Nd^{3+}$ as coactivator produces emission bands in the infrared spectral region between 870 and 1070 nanometers.

If the subject phosphate matrices are prepared without the uranyl ion but contain the rare ion, their photoluminescence spectra exhibit various excitation bands. The incorporation of uranyl ions introduces a broad excitation band for the rare earth emission which extends approximately 220 to 450 nanometers and peaks near 320 nanometers. This broad excitation band permits more efficient excitation of the rare earth emissions by permitting utilization of a greater proportion of the exciting energy available from broad band emitters. This is significant for mercury lamp applications since the resulting phosphor responds in the region where mercury vapor luminesces.

The alkali uranyl rare earth phosphate phosphor may be prepared in powder form by mixing $UO_3$ and a rare earth oxide with one or more alkali phosphates and treating the mixture at elevated temperatures. Suitable alkali phosphates are the monobasic alkali orthophosphates $$MH_2PO_4 \cdot nH_2O$$

analogues of microcosmic salt $NaHNH_4PO_4 \cdot 4H_2O$, the metaphosphates $(MPO_3)_n$, pyrophosphates $M_4P_2O_7$, where $n$ is equal to or greater than unity. Best results have been obtained when a uranyl salt, such as uranyl nitrate $$UO_2(NO_3)_2 \cdot 6H_2O$$

which is thermally decomposable to $UO_3$, is used as a source of $UO_3$. It has been found that in some cases a small addition of $P_2O_5$ in the form of $(NH_4)_2HPO_4$ improves the luminescence of the phosphor.

The mixture is thermally treated by firing in air in a suitable container at a temperature between 400° C. and the melting point of the phosphate for between ½ and 10 hours. Firing may be completed in a single step or in several steps, the material being mortared between each firing step. It has also been found possible in some cases to fuse the mixture and then anneal it at a temperature below the melting point thereof.

DESCRIPTION OF THE PREFERRED EMBODIMENTS

Example I

A first sample of sodium uranyl europium phosphate was prepared by dry-blending 4.00 grams of $$NaH_2PO_4 \cdot H_2O$$

0.191 gram $(NH_4)_2PO_4$, 0.146 gram $UO_2(NO_3)_2 \cdot 6\ H_2O$ and 0.153 gram $Eu_2O_3$ and firing the blend in air in a fused silica crucible. After an initial prefiring warm-up of about 30 minutes, the blend was fired at 525° C. for one hour. The sample was then allowed to cool to room temperature, mortared and then re-fired at 555° C. for one hour.

The resulting phosphor $$Na_2O \cdot 0.20(UO_3) \cdot 0.03(Eu_2O_3) \cdot 1.05(P_2O_5)$$

exhibited an orange emission under excitation by ultraviolet radiation, electrons, X-rays or ion bombardment. In particular, when excited with radiation from a low pressure mercury vapor lamp having its greatest energy output at a wavelength of 253.7 nanometers, the phosphor exhibited a luminosity value 90% that of europium activated yttrium vanadate $YVO_4$:Eu, a phosphor used commercially as a color corrector for high pressure mercury lamps and as the red-emitting phosphor in color television tubes. When compared with another known phosphor, europium activated yttrium oxide $Y_2O_3$:Eu, the emission of the new luminophor under low pressure mercury vapor lamp excitation had a luminosity value 123% that of the $Y_2O_3$:Eu. In response to radiation from a medium pressure mercury lamp having its peak emission in the group of spectral lines near 365 nanometers, the sodium uranyl europium phosphate material exhibited a luminosity value 131% that of $YVO_4$:Eu and many times greater than $Y_2O_3$:Eu. In all tests, visible radiation from the low and high pressure mercury vapor lamp sources was removed with a Corning 7–54 filter.

The relative luminosity of the red component of the emission from the new phosphor was determined by measuring the luminescence transmitted through a filter (Corning 2–63) which passes only light of wavelengths 580 nanometers or greater. The luminosity value of the red component was found to be 71% that of $YVO_4$:Eu and 108% that of $Y_2O_3$:Eu when excited by radiation from a low pressure mercury vapor lamp. Under excitation by a medium pressure mercury vapor lamp the luminosity value of the red component was 108% that of $YVO_4$:Eu. No meaningful comparison was possible with the $Y_2O_3$:Eu since its emission was insignificant under medium pressure excitation.

The above data indicate that the sodium uranyl europium phosphate is relatively efficient under excitation by both low and medium pressure mercury vapor lamps. Its broad excitation band peaks closer to the 365 nanometer output of the medium pressure lamp than does the $YVO_4$:Eu excitation band. Thus, it is more efficient with that excitation source.

A second sample having the same composition was prepared using the same firing schedule except that the second firing was carried out for two hours rather than one hour. The resulting phosphor has characteristics similar to that of the first sample except that its fluorescence is somewhat more reddish in color.

A third sample was prepared using the same firing schedule as was employed with the first sample; however, 0.459 gram $Eu_2O_3$ was used instead of 0.153 gram. The resulting phosphor, which has the formulation $$Na_2O \cdot 0.02(UO_3) \cdot 0.09(Eu_2O_3) \cdot 1.05(P_2O_5)$$

exhibits a greenish-white fluorescence when excited by the low and medium pressure mercury vapor lamp.

Fourth and fifth samples of sodium uranyl europium phosphate were prepared using the same firing schedule as for the first and third samples. The fourth sample differed from the first in that 0.306 gram $Eu_2O_3$ and 0.382 gram $(NH_4)_2HPO_4$ were used in place of the quantities disclosed for preparation of the first sample. The resulting phosphor $$Na_2O \cdot 0.20(UO_3) \cdot 0.06(Eu_2O_3) \cdot 1.10(P_2O_5)$$

exhibited a bright orange luminescence. The fifth sample also emitted orange luminescence. It differed from the first sample only in that 2.92 grams $UO_2(NO_3)_2 \cdot 6H_2O$ was used resulting in the formulation $$Na_2O \cdot 0.40(UO_3) \cdot 0.03(Eu_2O_3) \cdot 1.05(P_2O_5)$$

Example II

A sample of cesium uranyl europium phosphate having the formula $$Cs_2O \cdot 0.02(UO_3) \cdot 0.03(Eu_2O_3) \cdot 1.05(P_2O_5)$$

was prepared by blending 1.00 gram $CsH_2PO_4$, 0.0696 grams $(NH_4)_2HPO_4$, 0.0265 gram $UO_2(NO_3)_2 \cdot 6H_2O$ and 0.0279 gram $Eu_2O_3$ and then firing the blend at 525° C. for one hour. The blend was cooled, mortared and then refired at 525° C. for two hours. The resulting phosphor exhibited a bright orange luminescence under low and medium pressure mercury lamps.

Several samples of cesium uranyl phosphate phosphor were prepared. One such phosphor $$Cs_2O \cdot 0.400(UO_3) \cdot P_2O_5$$

was made by blending 2.00 grams $CsHPO_4$, 0.139 gram $(NH_4)_2HPO_4$, 1.06 grams $UO_2(NO_3)_2 \cdot 6H_2O$ and firing the blend at 525° C. for one hour followed by firing at 575° C. for one hour. Between firings the phosphor was cooled and mortared. Comparing the emission intensity of the material under a low pressure mercury lamp to a standard green-emitting phosphor, $Zn_2SiO_4$:Mn, it was found that the luminosity value was 108% that of the standard. When excited by a medium pressure lamp and using ZnS:Cu as the standard (since $ZnSiO_4$:Mn is a poor emitter at 365 nanometer excitation), the luminosity value was found to be 111% that of the ZnS:Cu standard.

Example III

Two samples of rubidium uranyl europium phosphate phosphor were prepared by firing a blend at 525° C. for one hour and then refiring after cooling and mortaring at 575° C. for one hour. The blend for the first sample consisted of 1.00 gram $RbH_2PO_4$, 0.0362 gram $$(NH_4)_2HPO_4$$

0.0775 gram $UO_2(NO_3)_2 \cdot 6H_2O$ and 0.0289 gram $Eu_2O_3$ resulting in the formulation $$Rb_2O \cdot 0.02(UO_3) \cdot 0.03(Eu_2O_3 \cdot 1.05(P_2O_5)$$

This material exhibited a red fluorescence.

The second sample differed from the first in that 0.0724 gram $(NH_4)_2HPO_4$ and 0.275 gram $UO_2(NO_3)_2 \cdot 6H_2O$ was substituted. The resulting phosphor $$Rb_2O \cdot 0.20(UO_3) \cdot 0.03(Eu_2O_3) \cdot 1.10(P_2O_5)$$

emitted green light when excited by the mercury vapor lamps.

A sample of rubidium uranyl phosphate $$Rb_2O \cdot 0.200(UO_3) \cdot P_2O_5$$

was synthesized by blending 1.50 grams $RbH_2PO_4$, 0.109 gram $(NH_4)_2HPO_4$ and 0.413 gram $UO_2(NO_3)_2 \cdot 6H_2O$ and firing the blend at 525° C. for one hour. After cooling and mortaring, the blend was refired at 575° C. for one hour. Compared under excitation from a low pressure mercury lamp, the luminosity value for the phosphor was approximately at 78% that of $ZnSiO_4$:Mn. Under medium pressure lamp excitation the luminosity was about 85% that of ZnS:Cu. A second sample of $$Rb_2O_3 \cdot 0.400(UO_3) \cdot P_2O_5$$

exhibited similar luminescence.

Example IV

A sample of potassium uranyl eropium phosphate phosphor was prepared by dry-blending 4.00 grams $KH_2PO_4$, 0.148 gram $UO_2(NO_3)_2 \cdot 6H_2O$ and 0.155 gram $Eu_2O_3$. The blend was fired by drying it at 100° C., heating slowly to 400° C., and then holding the blend at that temperature for one hour. The resulting formulation $$K_2O \cdot 0.02(UO_3) \cdot 0.03(Eu_2O_3) \cdot P_2O_5$$

exhibited orange-green luminescence.

A second sample of potassium uranyl europium phosphate was prepared by the same method except that 1.48 gram $UO_2(NO_3)_2 \cdot 6H_2O$ was used in lieu of the 0.148 gram of the first sample. The resulting phosphor $$K_2O \cdot 0.20(UO_3) \cdot 0.03(Eu_2O_3) \cdot P_2O_5$$

also responded to excitation by the mercury vapor lamp by fluorescing in the orange and green spectral regions.

Example V

Two samples of lithium uranyl europium phosphate phosphor were prepared using the firing schedule of Example IV. In the first sample, the blend consisted of 2.00 grams $Li_3PO_4$, 4.57 grams $(NH_4)_2HPO_4$, 0.260 gram $UO_2(NO_3)_2 \cdot 6H_2O$ and 0.274 gram $Eu_2O_3$. This phosphor, $Li_2O \cdot 0.02(UO_3) \cdot 0.03Eu_2O_3 \cdot P_2O_5$, luminesced in the orange nad green regions of the spectrum when excited by the mercury lamps. The second sample was similar to the first except that 2.60 grams $UO_2(NO_3)_2 \cdot 6H_2O$ was used in the blend for forming the composition $$Li_2O \cdot 0.20(UO_3) \cdot 0.03Eu_2O_3 \cdot P_2O_5$$

having a green luminescence under the same excitation conditions.

Samples of lithium uranyl phosphate and lithium sodium uranyl phosphate were also prepared. The lithium uranyl phosphate phosphor $Li_2O \cdot 0.066(UO_3) \cdot P_2O_5$ was formulated by blending 1.50 grams $Li_3PO_4$, 2.00 grams $$(NH_4)_2HPO_4$$

and 0.651 gram $UO_2(NO_3)_2 \cdot 6H_2O$ and then firing the blend at 400° C. for 2 hours. It was then cooled, mortared and refired at 525° C. for 2 hours. The phosphor exhibited green luminescence.

The lithium sodium uranyl phosphate phosphor $$(Na_{0.95}Li_{0.05})_2O \cdot 0.40(UO_3) \cdot P_2O_5$$

was prepared by mixing a blend of 3.80 grams $$NaH_2PO_4 \cdot H_2O$$

0.0554 gram $Li_3PO_4$, 0.223 gram $(NH_4)_2HPO_4$, 2.92 grams $UO_2(NO_3)_2 \cdot 6H_2O$ and firing the blend for 2 hours at 500° C. and then refiring for 2 hours at 525° C. Using a $Zn_2SiO_4$:Mn as a standard it was found that lithium sodium uranyl phosphate exhibits 110% of the luminosity thereof. When excited by a medium pressure mercury vapor lamp and using ZnS:Cu as the standard, the relative luminosity of the new composition was 98% that of the ZnS:Cu standard.

Example VI

A sample of sodium uranyl samarium phosphate phosphor was prepared by blending 4.00 grams $NaH_2PO_4 \cdot H_2O$, 0.191 gram $(NH_4)_2HPO_4$, 1.45 grams $UO_2(NO_3)_2 \cdot 6H_2O$ and 0.0506 gram Sm and firing the blend at 525° C. for one hour. After cooling, the blend was mortared and refired at 525° C. for one hour. The resulting phosphor $Na_2O \cdot 0.20(UO_3) \cdot 0.01Sm_2O_3 \cdot 1.05P_2O_5$ emitted orange luminescence under the mercury lamp excitation.

A sample of sodium uranyl neodymium phosphate phosphor was prepared by the same method as the samarium activated material except that the blend contained 0.0488 gram Nd instead of Sm. The resulting phosphor $Na_2O \cdot 0.20(UO_3) \cdot 0.01Nd_2O_3 \cdot 1.05(P_2O_5)$ emitted in the green and infrared regions of the spectrum.

As many changes could be made in the above described compositions and processes it is intended that all matter contained therein shall be interpreted as illustrative and not in a limiting sense.

What is claimed is:

1. A phosphor composition having the formula $$a(M_2O) \cdot b(UO_3) \cdot c(R_2O_3) \cdot d(P_2O_5)$$

where M is an alkali metal selected from the group consisting of Li, Na, K, Rb and Cs, R is a rare earth metal selected from the group consisting of Eu, Sm and Nd, $a$ is equal to one, $b$ is in the approximate range 0.01–0.04, $c$ is in the approximate range 0.01–0.09 and the ratio $a/d$ is less than 3.

2. A phosphor composition as defined by claim 1 wherein M is Na, R is Eu, $b$ is in the approximate range 0.02–0.40, $c$ is in the approximate range 0.03–0.09 and $a/d$ is less than 3.

3. A phosphor composition as defined by claim 1 wherein M is Cs, R is Eu, $b$ is approximately 0.02, $c$ is approximately 0.03 and $a/d$ is less than 3.

4. A phosphor composition as defined by claim 1 wherein M is Rb, R is Eu, $b$ is in the approximate range 0.02–0.20, $c$ is approximately 0.03 and $a/d$ is less than 3.

5. A phosphor composition as defined by claim 1 wherein M is K, R is Eu, $b$ is in the approximate range 0.02–0.20, $c$ is approximately 0.03 anl $a/d$ is approximately unity.

6. A phosphor composition as defined by claim 1 wherein M is Li, R is Eu, $b$ is in the approximate range 0.02–0.20, $c$ is approximately 0.03 and $a/d$ is approximately unity.

7. A phosphor composition as defined by claim 1 wherein M is Na, R is selected from the subgroup consisting of Sm and Nd, $b$ is approximately 0.2, $c$ is approximately 0.01, and $a/d$ is approximately unity.

8. A phosphor composition having the formula $$a(M_2O) \cdot b(UO_3) \cdot d(P_2O_5),$$

where M is an alkali metal selected from the group consisting of Li, Rb and Cs, $a$ is equal to one, $b$ is in the approximate range 0.01 to 0.40, and the ratio $a/d$ is less than 3.

9. A phosphor composition as defined by claim 8 wherein M is Rb, $b$ is in the approximate range 0.2–0.4 and $a/d$ is approximately unity.

10. A phosphor composition as defined by claim 8 wherein M is Li, $b$ is approximately 0.066 and $a/d$ is approximately unity.

References Cited

UNITED STATES PATENTS

| | | | |
|---|---|---|---|
| 2,470,449 | 5/1949 | Williams | 252—301.1 |
| 3,163,608 | 12/1964 | Yocom | 252—301.1 |
| 3,394,084 | 7/1968 | Avella | 252—301.1 |
| 3,408,303 | 10/1968 | Borchardt | 252—301.1 |
| 3,457,179 | 7/1969 | Natansohn | 252—301.1 |

OTHER REFERENCES

Levshin et al., Rare Earth Elements, pp. 340–349, Publ. by Acad. of Sciences, Moscow 1959.

CARL D. QUARFORTH, Primary Examiner

F. M. GITTES, Assistant Examiner

U.S. Cl. X.R.

252—301.4